United States Patent [19]

Brookner et al.

[11] Patent Number: 4,720,712

[45] Date of Patent: Jan. 19, 1988

[54] ADAPTIVE BEAM FORMING APPARATUS

[75] Inventors: Eli Brookner, Lexington; James M. Howell, Hudson, both of Mass.

[73] Assignee: Raytheon Company, Lexington, Mass.

[21] Appl. No.: 764,803

[22] Filed: Aug. 12, 1985

[51] Int. Cl.[4] .......... G01S 3/16; G01S 3/28

[52] U.S. Cl. .......... 342/383

[58] Field of Search .......... 343/379, 380, 381, 382, 343/383

[56] References Cited

U.S. PATENT DOCUMENTS

| | | | |
|---|---|---|---|
| 3,761,936 | 9/1973 | Archer et al. . | |
| 3,979,754 | 9/1976 | Archer . | |
| 4,044,359 | 8/1977 | Applebaum et al. . | |
| 4,280,128 | 7/1981 | Masak | 343/380 |
| 4,445,119 | 4/1984 | Works . | |
| 4,516,126 | 5/1985 | Masak et al. . | |
| 4,553,146 | 11/1985 | Butler | 342/379 |
| 4,577,193 | 3/1986 | Kiuchi et al. | 343/380 |

OTHER PUBLICATIONS

"Explorations in Fixed and Adaptive Resolution at GE and SURC" by Paul W. Howells, IEEE Transactions on Antenna and Propagation, vol. AP-24, No. 5, Sep. 1976, 575–584.

"Adaptive Arrays—An Introduction" by William F. Gabriel, Proceedings of the IEEE, vol. 64, No. 2, Feb. 1976, pp. 239–272.

"Adaptive Arrays" by Sidney P. Applebaum, IEEE Transactions on Antennas and Propagation, vol. AP-24, No. 5, Sep. 1976, pp. 585–598.

"Rapid Convergence Rate in Antenna Arrays" by I. S. Reed, J. D. Mallett and L. E. Brennan, IEEE Transactions on Aerospace and Electronic Systems, vol. AES-10, No. 6, Nov. 1984, pp. 853–863.

"Wide-Angle Microwave Lens for Line Source Applications" by W. Rotman and R. F. Turner, IEEE Transactions on Antennas and Propagation, Nov. 1963, pp. 624–632.

"Phased-Array Beam Steering by Multiples Sampling" by Major A. Johnson, Proceedings of the IEEE, vol. 56, No. 11, Nov. 1968, pp. 1801–1811.

"Spectrum Analyses—A Modern Perspective" by S. M. Key and S. L. Marple, Jr., Proceedings of the IEEE, vol. 69, No. 11, Nov. 1981, pp. 1380–1418.

*Primary Examiner*—Theodore M. Blum

*Attorney, Agent, or Firm*—Richard M. Sharkansky

[57] ABSTRACT

A beam forming apparatus is provided having a plurality of beam ports producing a corresponding plurality of differently directed beams, each one of such beams being associated with a corresponding one of the beam ports, one of such beams being directed at a desired signal source and at least one of the beams being directed at an interfering signal source. A processor is coupled to the beam ports, for combining signals at such beam ports into a composite signal with the ratio of the power of the desired signal component of such composite signal to the power of the interfering signal component of such composite signal being increased from the ratio of the power in such desired and interfering signal components at the one of the beam ports associated with the beam directed at the desired signal source. The beam forming apparatus directs one of the beams at a desired signal source and an additional beam at each one of a number of interfering signal sources. The signals within the additional beams are weighted and then subtracted from the signals in the desired signal directed beam to substantially cancel the interfering signals from the desired signal. The number of weights required for computation is equal to the desired signal port plus the number of additional beam ports; i.e., one plus the number of interfering signal sources.

5 Claims, 13 Drawing Figures

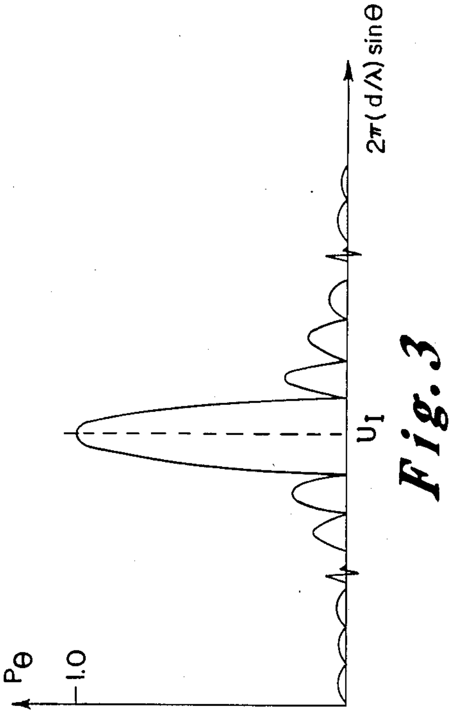
Fig. 3
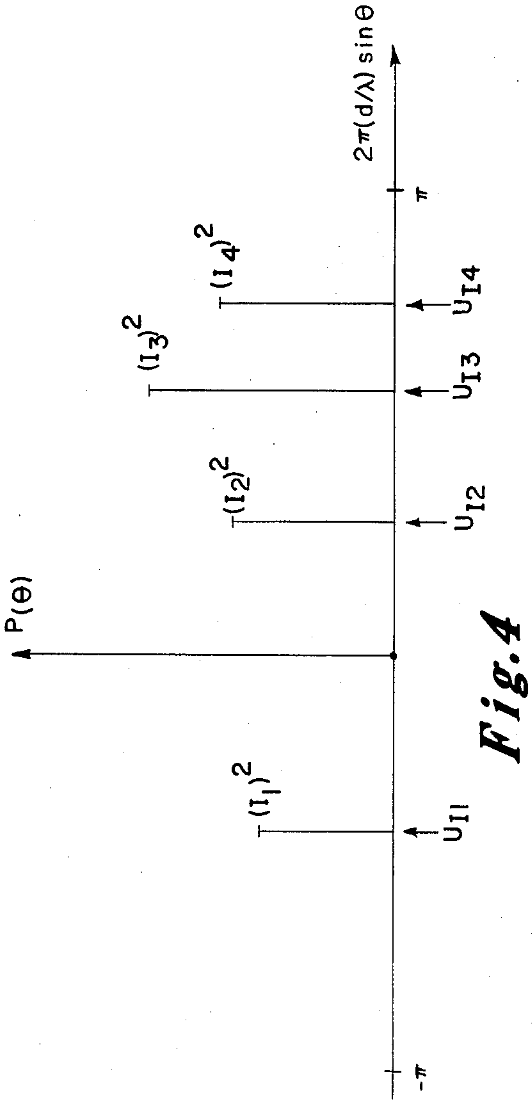
Fig. 4
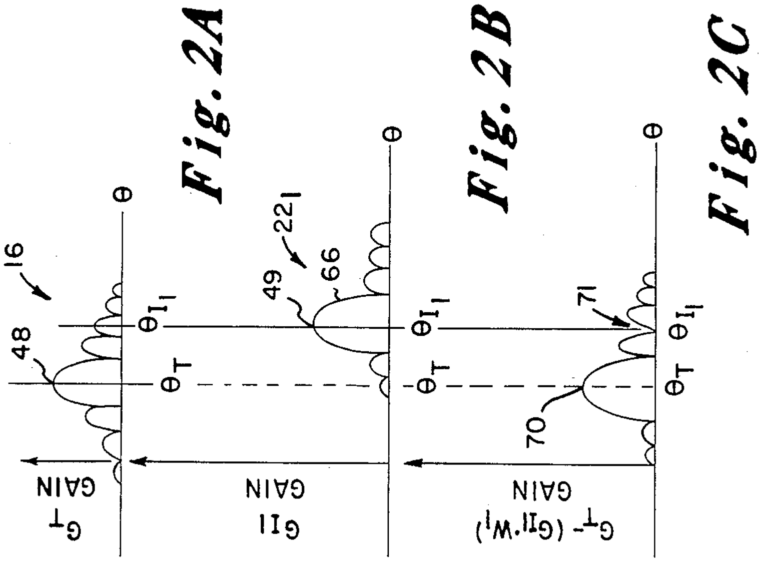
Fig. 2A
Fig. 2B
Fig. 2C

ADAPTIVE BEAM FORMING APPARATUS

BACKGROUND OF THE INVENTION

This invention relates generally to beam forming apparatus and more particularly to beam forming apparatus adapted to form beams having shapes in accordance with signals received by the apparatus from an environment having both desired signal sources and undesired noise or interfering signal sources.

As is known in the art, beam forming apparatus are used to form beams of sonic or electromagnetic radiation. The shape of the beam is related to the phase and amplitude distributions provided to signals received across an aperture of the apparatus. One type of beam forming apparatus is adapted to sense the received signals incident across the aperture and then adjust the phase and amplitude of such received signals in accordance with some desired performance criterion, such as maximization of the received signal-to-noise ratio. Such apparatus may thus be considered as an adaptive beam forming apparatus, and, when used in radar systems, such apparatus is generally referred to as an adaptive antenna as discussed in a book entitled *Introduction to Radar Systems* by Merrill I. Skolnick (second edition), published by McGraw-Hill Book Company, 1980, Page Nos. 332 and 333. Additional discussions of adaptive arrays are presented in an article entitled "Adaptive Arrays - An Introduction", by William F. Gabriel, published in the "Proceedings of the IEEE", Volume 64, No. 2, February 1976, Page Nos. 239–272. In such article, it is pointed out that an adaptive array is a system having an array of antenna elements and a real-time adaptive receiver processor which, given a beam steering command, samples its current environment and then automatically proceeds to adjust its element control weights towards optimization, usually to maximize the output signal-to-noise ratio. The noise may consist of deliberate electronic counter-measures, friendly radio frequency interference, clutter scatter returns, and natural noise sources. One technique suggested for adaptively optimizing the signal-to-noise ratio is discussed in a paper entitled "Adaptive Array" by Sidney P. Applebaum published in the "IEEE Transactions on Antennas and Propagation", Volume AP-24, No. 5, September 1976. Maximization of the signal-to-noise ratio is achieved when signals received by the antenna elements are weighted in accordance with the equation: $W=\mu M^{-1} S^*$, where W is a matrix of the weighting factors to be applied to the received signals at the antenna elements; M is the covariance matrix of the noise component of the received signals; $\mu$ is an arbitrary constant; and, $S^*$ is the complex conjugate of the phase distribution of the desired signal to be detected across the array elements. The article uses this equation and applies it to a linear, uniformly spaced array of antenna elements. It is assumed that in the quiescent environment, the noise outputs of the antenna elements have equal powers. The noise environment studied is that of a single jammer added to the quiescent environment. The desired signal is assumed to be at an angle $\theta_s$ from the mechanical boresight, while the jammer is assumed to be at an angle $\theta_j$ from the mechanical boresight. The author then shows that the beam or radiating pattern resulting from applying weights in accordance with the aforementioned equation consists of two parts: the first is the quiescent pattern (that is the pattern which would be produced by the apparatus in the absence of the jammer; one with the main lobe pointing in the direction of the desired signal, i.e., at angle $\theta_s$); and, the second, which is subtracted from the quiescent pattern, is a (sin Kx/sin x) shaped beam centered on the jammer, where K is the number of antenna elements in the array and x is related to the angle from boresight. As a result of weighting the signals received by the antenna elements in accordance with the equation, the gains of both the first and second part of the resulting beam are equal to each other at the jammer angle $\theta_j$. The result of the subtraction of the two parts therefore is a resulting beam having a substantial null in the direction of the jammer, that is, at the angle $\theta_j$. It should be noted that with this technique, weighting factors must be computed for each of the signals produced at each of the antenna elements, a relatively complex signal processing problem. A technique described which enables rapid convergence of the solution to the aforementioned equation is described in an article entitled "Rapid Convergence Rate in Adaptive Arrays" by I. S. Reed, J. D. Mallett and L. E. Brennan, published in the "IEEE Transactions on Aerospace and Electronic Systems", Volume AES-10, No. 6, November 1984, Page Nos. 853–863. The technique described therein is referred to as "Sample Matrix Inversion" (SMI). With such technique, an estimate is made of the covariance matrix $\hat{M}$ using S samples. Next, the estimated $\hat{M}$ of M is inverted, finally, the filter $\hat{M}^{-1}S^*$ is formed. While the SMI technique does result in a more rapid convergence in the solution of the Appelbaum equation such technique sometimes produces a resulting beam having relatively poor antenna side lobes when applied to arrays having a reasonable number of antenna elements.

SUMMARY OF THE INVENTION

In accordance with the present invention, a beam forming apparatus is provided comprising: (a) means, having a plurality of beam ports, for producing a corresponding plurality of differently directed beams, each one of such beams being associated with a corresponding one of the beam ports, one of such beams being directed at a desired signal source and at least one of the beams being directed at an interfering signal source; and, (b) means, coupled to the beam ports, for combining signals at such beam ports into a composite signal with the ratio of the power of the desired signal component of such composite signal to the power of the interfering signal component of such composite signal being increased from the ratio of the power in such desired and interfering signal components at the one of the beam ports associated with the beam directed at the desired signal source.

In accordance with one feature of the invention, the beam forming apparatus directs one of the beams at a desired signal source and an additional beam at each one of a number of interfering signal sources. The signals within the additional beams are weighted and then subtracted from the signals in the desired signal directed beam to substantially cancel the interfering signals from the desired signal. The cancellation is obtained by weighting the signals in each of the additional beams by factors to equalize the gain of each additional beam to the gain of the desired signal directed beam at an angle corresponding to in the direction of the additional beam; thus, if the additional beams are directed to interfering sources at angles $\theta_{I1}$ to $\theta_{IR}$, respectively, the signals in such additional beams are weighted to equalize the gain of such additional beams to the gain of the desired signal beam at the angles $\theta_{I1}$ to $\theta_{IR}$, respectively. Thus, whereas in the Applebaum approach, where a single jammer case was considered, a composite beam was formed from a single beam port by weighting the signals at each of the antenna elements; one beam being directed at the desired signal source and one being at the interfering source with the same gain as the gain of the desired signal source beam at the angle of the jammer, here the beam forming apparatus includes means for producing each portion of the composite beam from a corresponding one of a pair of beam ports (i.e., one of the pair of ports producing the beam at the desired signal and the other at the interfering source) with the proper weighting to effect the desired cancellation being applied to the signals at the pair of beam ports. Thus, rather than having to compute weights for the signals at each of the antenna elements, here the number of weights required for computation is equal to the desired signal port plus the number of additional beam ports; i.e., one plus the number of interfering signal sources. The signals produced at these beam ports are processed in a manner to maximize the signal-to-interference ratio, and, in a preferred embodiment, the Sample Matrix Inversion (SMI) technique is used for such process. With such arrangement, the number of outputs to be processed, in accordance with the invention, is one plus the number of interfering signal sources, as distinguished from processing a number of outputs equal to the number of antenna elements in an array as in the SMI technique. Further, the sidelobe degradation associated with the SMI technique is substantially removed.

More specifically, the invention involves transforming a large array of N elements into an equivalent similar array of R+1 elements, where R is the number of interfering sources, and where R is typically much less than N. An estimate is made of the number of locations of the interfering sources. Once the number and locations of the interfering sources have been determined, the additional beams are formed in the direction of the interfering sources using the whole array. Consequently, the number of degrees of freedom in the transformed array is reduced from N to one plus the number of interfering sources.

BRIEF DESCRIPTION OF THE DRAWINGS

The foregoing features of this invention, as well as the invention itself, may be more fully understood from the following detailed description read together with the accompanying drawings, in which:

FIGS. 2A, 2B and 2C show antenna patterns associated with a desired signal port, interfering signal port, and output beam port, respectively, of the antenna system of FIG. 1;

FIG. 3 is a curve showing the power distribution as a function of angle of a single interfering signal source received by the antenna system of FIG. 1;

FIG. 4 is a curve showing the peak power distribution as a function of angle of a plurality of interfering signal sources received by the antenna system of FIG. 1;

DESCRIPTION OF THE PREFERRED EMBODIMENT

Figure 1:
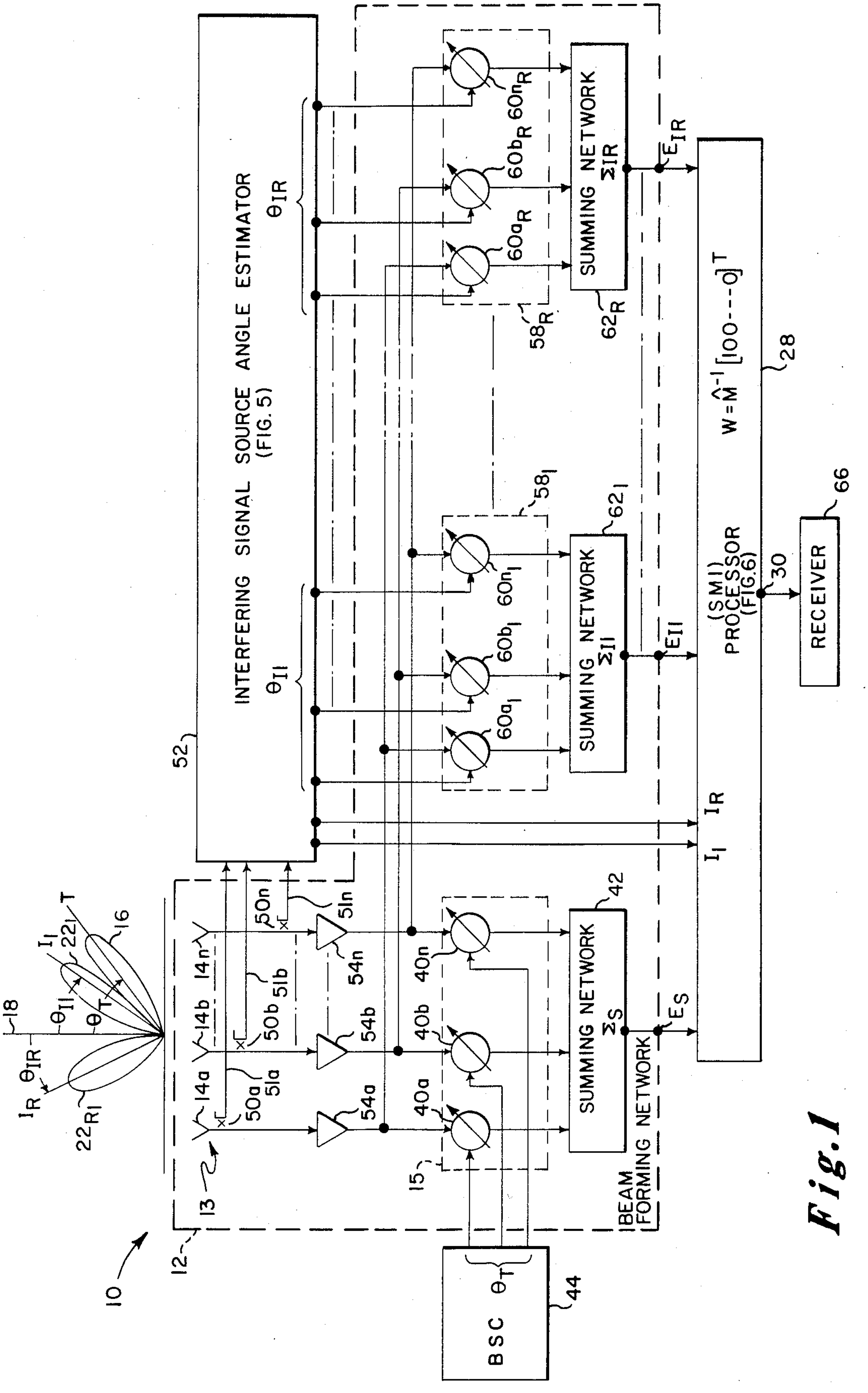
FIG. 1 is a block diagram of an antenna system using a beam forming network according to the invention.

Referring now to FIG. 1, a radio frequency antenna system 10 is shown to include a beam forming network 12 adapted to produce a plurality of differently directed beams from a common aperture 13, here formed by a linear array of N antenna elements, here designated 14*a*–14*n*, the direction of such beams being produced in a manner to be described hereinafter. Suffice it to say here, however, that one of such beams, here target beam 16, is, as shown, directed to a desired target, here a target T at an angle $\theta_T$ from the mechanical boresight axis 18 of the antenna system 10 and the additional beams $22_1$–$22_R$ are, as shown, directed to R interfering signal sources $I_1$–$I_R$ (here such interfering signal sources $I_1$–$I_R$ being at angles $\theta_{I1}$ to $\theta_{IR}$, respectively, from the mechanical boresight axis 18. The beam forming network 12 has a desired signal beam port $E_S$ and a plurality of interference signal beam ports $E_{I1}$–$E_{IR}$. Desired signal beam port $E_S$ is associated with target beam 16 and thus receives signals within such target beam 16. Interference signal beam ports $E_{I1}$–$E_{IR}$ are associated with additional beams $22_1$–$22_R$, respectively, and thus such beam ports $E_{I1}$–$E_{IR}$ receive signals within beams $22_1$–$22_R$, respectively. It is noted that, as is well known, each one of the beams 16, $22_1$–$22_R$ has a main lobe and side lobes. Thus, even if the main lobe of target beam 16 is directed at a target, energy from the interfering signal sources $I_1$–$I_R$, which is in the sidelobes of the target beam 16, is received at the desired signal beam port $E_S$ in addition to the energy from the target. Thus, the signal at the desired signal beam port $E_S$ is a composite signal having a desired signal component (i.e., signals from the target) and an interfering signal component (i.e., signals from the interfering signal sources). Further, if the power of an interfering signal source is substantially large compared with the desired signal power, such interference may deter the ability of the system to detect the desired target signal. The signals produced at the desired signal beam port $E_S$ and at the interfering signal beam ports $E_{I1}$–$E_{IR}$ are fed to a processor 28. While the details of the processor 28 will be described hereinafter, it is here noted that such processor 28 combines the signals received at beam ports $E_S$ and $E_{I1}$ to $E_{IR}$ into a composite signal at port 30 with the ratio of the power of the desired signal component of such composite signal to the power of the interfering signal component of such composite signal being increased from the ratio of the power in the desired signal component of the signal at the desired signal beam port $E_S$ to the power in the interfering signal component of the signal at such desired signal beam port. Here, processor 28 processes the signals at beam ports $E_S$ and $E_{I1}$ to $E_{IR}$ in accordance with the Sample Matrix Inversion (SMI)

technique to produce at port 30 a signal having the maximum ratio of desired signal power to interfering signal power.

Referring now in more detail to FIG. 1, here antenna system 10 is shown to use in the beam forming network 12 phased array techniques. A portion of the signals received by the antenna elements **14*a*–14*n* is coupled, via directional couplers 50*a*–50*n* and lines 51*a*–51*n*, to an interfering signal source angle estimator 52 while the remaining portion of such signals is fed to radio frequency (RF) amplifiers 54*a*–54*n*. The signals at the outputs of the plurality of amplifiers 54*a*–54*n* are distributed equally using a conventional (R+1):1 power dividers, not shown, to a first set 15 of, n, electronically controllable shifters 40*a*–40*n* and also to a plurality, here R, sets $58_1$–$58_R$ of electronically controllable phase shifters $60a_1$–$60n_1$ to $60a_R$–$60n_R$, as shown. The outputs of the phase shifters 40*a*–40*n* of set 15 are fed to a conventional summing network 42. Control signals for the phase shifters 40*a*–40*n* of set 15 are provided by a conventional beam steering computer (BSC) 44. Thus, in response to control signals from BSC 44, a collimated beam is formed and directed to a selected angle from the mechanical boresight axis 18; more particularly, the beam is the target beam 16 referred to above and signals within such beam 16 are focussed to desired signal beam port $E_S$ of summing network 42. The radiation pattern of the target beam 16 is shown in FIG. 2A. As shown in FIG. 2A, the main lobe 48 of beam 16 is at angle $\theta_T$ from the mechanical boresight axis 18 (i.e., $\eta=0°$). The outputs of each one of the R sets $58_1$–$58_R$ of phase shifters are fed to a corresponding one of R summing networks $62_1$–$62_R$, as shown; the outputs of which are the interfering signal beam ports $E_{I1}$–$E_{IR}$, respectively. Each one of the R sets $58_1$–$58_R$ of phase shifters is used to form, in response to control signals from the interference signal source angle estimator 52, a collimated beam directed to a corresponding one of the R interfering signal sources $I_1$–$I_R$. As will be discussed in detail below, the interfering signal source angle estimator 52 determines the angular deviation from boresight of each one of R potential interfering signal sources (where $R \leqq \leqq N$); that is, such angle estimator determines the angles $\theta_{I1}$–$\theta_{IR}$ referred to above and then produces up to R sets of control signals, one set for each one of the R sets $58_1$–$58_R$ of phase shifters. Each set of control signals results in the formation of a corresponding one of the R additional beams. The radiation pattern of a typical one of the additional beams $22_1$–$22_R$, here beam $22_1$, is shown in FIG. 2B. It is noted that the main lobe 49 is directed at angle $\theta_{I1}$ from boresight ($\theta=0°$). The signals focussed to beam ports $E_S$ and $E_{I1}$–$E_{IR}$ are fed to processor 28. Here processor 28, as noted above, processes the signals at such ports in accordance with the SMI technique to produce at processor 28 output port 30 a signal having the maximum ratio of desired signal power to interfering signal power. The output port 30 is coupled to the input of conventional receiver 66, as shown. The processor 28 weights the signals at each one of the interfering signal source ports $E_{I1}$–$E_{IR}$ by corresponding weighting factors $W_1$–$W_R$, respectively. The weighting factors are calculated by the processor 28 so that the weighting factors $W_1$–$W_R$ times the respective gains $G_{I1}$–$G_{IR}$ of the additional beams $22_1$–$22_R$, respectively, are substantially made equal to the gain of the target beam $G_T$ at the angles $\theta_{I1}$–$\theta_{IR}$, respectively. The processor 28 then subtracts each one of the weighted signals $E_{I1}W_1$ to $E_{IR}W_R$ from the target beam 16. Thus, referring to FIGS. 2A and 2B, the processor 28 may be considered as having the effect of subtracting the additional beam $22_1$ from the target beam 16 with the gain of the radiation pattern of beam $22_1$ at angle $\theta_{I1}$ being made approximately equal to the gain of the target beam 16 at the angle $\theta_{I1}$. That is, $G_1(\theta_{I1})\cdot W_1$ is equal to $G_T(\theta_{I1})$ so that $G_T(\theta_{I1})-G_1(\theta_{I1})W_1 \approx 0$ where $W_1$ is produced by processor 28. The resulting radiation pattern (i.e., radiation pattern associated with output beam port 30) may thus be viewed as that shown in FIG. 2C and is designated by numeral 70. It is noted that the main lobe of the resulting radiation pattern 70 is at the angle $\theta_T$ and that such radiation pattern 70 has a null 71** at angle $\theta_{I1}$.

As noted briefly above, the interfering signal source angle estimator 52 is used to locate the number, R, of the interfering sources, and the angular orientation $\theta_{I1}$–$\theta_{IR}$ of each of the R interfering signal sources. Various techniques may be used, for example: spatial discrete Fourier transformation (DFT) of the cross correlation of the interfering signals distributed across the array of antenna elements $14_1$–$14_n$ into a power distribution as a function of angular deviation from the mechanical boresight axis; the so-called MOSAR technique described in an article entitled "Phased-Array Beam Steering by Multiplex Sampling" by Major A. Johnson, published in the "Proceedings of the IEEE", Volume 56, No. 11, November 1968; a maximum entropy estimation technique described in an article entitled "Spectrum Analyses - A Modern Perspective" by S. M. Key and S. L. Marple, Jr., published in the "Proceedings of the IEEE", Volume 69, No. 11, November 1981, Pgs. 1380–1418; and, also in a Ph.D. dissertation by J. P. Berg entitled "Maximum Entrophy Spectral Analyses", Department of Geophysics, Stanford University, Stanford, Calif., May 1975; or, by a search in angle with auxiliary beams. Here, interfering signal source angle estimator 52 uses a spatial Discrete Fourier Transformation (DFT) of the output of the antenna elements **14*a*–14*n*. Thus, considering an N element linear array of antenna elements 14*a*–14*n* and a single interfering signal source (i.e., R=1) at angle $\theta_I$ from the mechanical boresight axis, and the target or desired signal at angle $\theta_T$, the signal $E_i$ received by the ith one of the N antenna 14*a*–14*n*** elements may be represented, in complex notation, as:

$$E_i = Ie^{+j(i-1)UI} + N_i \quad i=1, 2, \ldots, N \tag{1}$$

where:

$U_I=(2\pi d/\lambda)\sin\theta_I$;

d=separation between the antenna elements;

$\overline{N_i}=0$;

I is noiselike interfering signal source modulation;

λ is the operating wavelength;

$j=\sqrt{-1}$;

$N_i$=thermal noise in the ith antenna element $\overline{|I|^2} >> \overline{|N_i|^2}$ (for all i); $\overline{|I|^2} >>$ desired signal power ($P_s$); and "‾" represents average.

The covariance between the signal $E_1$ received by the first one of the antenna elements and the signal Ei received by the ith antenna element may be expressed as:

$$\overline{E_1E_i^*} = \overline{(Ie^{+0jUI} + N_1)(I^*e^{-j(i-1)UI} + N^*_i)} \tag{2}$$

$$= \overline{|I|^2e^{-jUI(i-1)}} + \overline{N_i^*Ie^{+0jUI}} + \overline{N_1I^*e^{-j(i-1)UI} + N_1N^*_i}$$

-continued $$= \overline{|I|^2}e^{j0} + \overline{|N_1|^2} \simeq \overline{|I^2|} \quad i = 1$$

$$= \overline{|I|^2}e^{-jUI(i-1)} \quad i \neq 0$$

where: "*" represents complex conjugate.

It follows then that if the covariance matrix of the interfering signal I received by the antenna elements is M, the first row of the covariance matrix may be expressed as:

$$M_1 = [M_{1,1}, M_{1,2}, \ldots, M_{1,N}] \quad (3)$$

$$= [\overline{E_1E_1^*}, \overline{E_1E_2^*}, \ldots, \overline{E_1E_N^*}]$$

$$= |I|^2[e^{-j0}, e^{-jU_I}, \ldots, e^{-j(N-1)U_I}]$$

Transforming the terms in the first row of the covariance matrices which represents the spatial distribution of the covariance across the antenna elements $14_1$-$14_n$, (i.e., spatial covariance) into the $\theta$ domain (where $\theta$ is the angular deviation from boresight), using the Discrete Fourier Transform (DFT), the power distribution of the noise covariance over angle, i.e., $P(\theta)$ may be represented as:

$$P(\theta) = \frac{1}{N}\sum_{i=0}^{N-1} M_{1,i}e^{+ji(2\pi d/\lambda)\sin\theta} \quad (4)$$

$$= |I|^2\frac{1}{N}\sum_{i=0}^{N-1} e^{-ijUI}e^{+ji(2\pi d/\lambda)\sin\theta}$$

Thus, if $|I|^2/N$ is assumed equal to 1 (to normalize equation (4))

$$P(\theta) = \sum_{i=0}^{N-1} e^{-jiUI+ji(2\pi d/\lambda)\sin\theta} \quad (5)$$

$$= \sum_{i=0}^{N-1} e^{-ji(UI-(2\pi d/\lambda)\sin\theta}$$

$$= \sum_{i=0}^{N-1} Z^i; \text{ where } Z = e^{-j[UI-(2\pi d/\lambda)\sin\theta]}$$

$$= \frac{1-Z^N}{1-Z} = \frac{Z^{N/2}}{Z^{1/2}}\cdot\frac{Z^{N/2}-Z^{-N/2}}{Z^{1/2}-Z^{-1/2}}$$

$$= Z^{(N-1)/2}\frac{\sin[U_I-(2\pi d/\lambda)\sin\theta](N/2)}{\sin[U_I-(2\pi d/\lambda)\sin\theta](1/2)}$$

Thus, if $\theta$ in Equation (5) equals $\theta_I$, $P(\theta)$ is at a peak thereby indicating that the interfering source is at the angle $\theta_I$, as shown in FIG. 3. Thus, here if the interfering signal source angle estimator 52 determines more than one independent interfering source are present (i.e., here R independent sources), then by superposition:

$$M_{1,i} = \sum_{r=1}^{R} |I_r|^2e^{j(i-1)UIr};\ i = 0, \ldots (N-1) \quad (6)$$

where $U_{Ir}=(2\pi d/\lambda)\sin\theta_{Ir}$

Hence $$P(\theta) = \sum_{r=1}^{R} \overline{|I_r|^2}Z^{(N-1)/2}\frac{\sin[(U_{Ir}-(2\pi d/\lambda)\sin\theta)N/2]}{\sin[(U_{Ir}-(2\pi d/\lambda)\sin\theta)(1/2)]} \quad (7)$$

Thus, $P(\theta)$ gives the directions ($\theta_{I1}, \ldots \theta_{IR}$) and strengths ($|I_r|^2$, r=0, 1, . . . , R) of the R interfering signal sources. A typical $P(\theta)$ is shown in FIG. 4; here only the line spectra of $P(\theta)$ being shown after threshold detection, the angular positions $\theta_{I1}$-$\theta_{IR}$ for each of R interfering sources are thus determined. The interfering signal source angle estimator 52 then sends R sets of control signals to the R sets $\mathbf{58}_1$-$\mathbf{58}_R$ of phase shifters $\mathbf{60}a_1$-$\mathbf{60}n_1$ to $\mathbf{60}a_R$-$\mathbf{60}n_R$ with the result that each one of R collimated beams is directed to a corresponding one of the R interfering signal sources, each one of the R beams being associated with a corresponding one of the R interfering signal beam ports $E_{I1}$-$E_{IR}$, respectively.

The signals produced at the interfering signal beam ports $E_{I1}$-$E_{IR}$ are used together with the signal at the desired signal beam port $E_S$ to cancel the interfering signals received at the desired signal port $E_S$. Here, the SMI technique is used to effect the desired cancellation; however, the Applebaum-Howell technique described in the article by Sidney P. Applebaum (referred to above) may also be used. Such cancellation is produced in the processor 28. Thus, if $\hat{M}_T$ is the estimate of the covariance matrix of the "transformed array" i.e., the covariance of the signals at ports $E_S$, $E_{I1}$-$E_{IR}$, the optimum weights $W_{opt}$(i.e., to maximize the ratio of desired signal power to interfering signal power) is given by:

$$W_{opt}=M_T^{-1}S^*$$

where, for this system S=T, where

T is a 1×R array given by $T^t=[1, 0, 0, \ldots 0]$ where t stands for transpose.

It is noted that because the SMI technique is applied to R+1 variables instead of N variables (i.e., the signals produced by each of the N antenna elements $14_1$-$14_n$), the number of computations is significantly reduced. Instead of inverting N×N array, only a (R+1)×(R+1) array must be inverted; it being noted that the number of interfering signal sources R is significantly less than the number of array elements N. For example, for a linear array of N=100 elements, if there are R=10 interfering signal sources $2\times10^6$ complex multiplications would be required to determine weighting factors to be applied to the signals received by the antenna element as described in the Reed et al article referenced above, whereas, according to the invention, only $10^4$ complex multiplications are required to determine weighting factors to be applied to the signals produced at ports $E_S$, $E_{I1}$-$E_{IR}$; over two orders of magnitude lower than that in the prior methods which process the outputs of each of the antenna elements. Whereas the Applebaum approach forms a composite beam from an N element array at the output of a single port by appropriately weighting and adding the outputs of the N elements of the array, here from an N element array a similar composite beam is formed by using R+1 beam forming networks, one beam pointing at the desired signal direction and the R beams pointing at the R interfering signal sources present and then appropriately weighting and adding the R+1 outputs (instead of N). This approach reduces the computation complexity as indicated above with the Applebaum approach. It also reduces the time required to form the weights (equivalently the settling time or transient time), fewer time samples being needed to calculate the weights if the Reed et al fast sample matrix inversion algorithm is used to calculate the weights in both cases. For example, for the above example the settling time is reduced from 2N=200 time samples with the combined Applebaum/-Reed approach (which involves using the Applebaum N element adaptive array together with the Reed et al fast matrix inversion algorithm) whereas only 2R=10 time samples for R=5 interfering signal sources present is needed if the approach herein described is used, an improvement of a factor of 20. The improvement would be 2000 for a 100×100=10,000 element array. Also, the approach described herein has the advantage of not degrading the antenna composite beam sidelobes in the directions other than where the R interfering signal sources are located as may occur with the combined Applebaum/Reed approach.

Maintaining low antenna sidelobes in directions other than where the interfering signal sources are located is highly desirable in the presence of intermittent short pulse interference coming through the radar sidelobes and/or ground radars which have clutter in the sidelobes and the main lobe. Finally, the approach herein described still has essentially the same optimum signal to interference ratio as the Applebaum N element adaptive array. Thus, rather than having to compute weights for each of the antenna elements, here the number of weights required for computation is equal to the desired signal port plus the number of additional beam ports; i.e., one plus the number of interfering signal sources.

For example, in the case of a single interfering signal source, at angle $\theta_{I1}$ beam forming signals are fed to phase shifters 60$a_1$–60$n_1$ by the interfering signal source angle estimator 52 so the beam associated with beam port $E_{I1}$ is directed at angle $\theta_I$. The beam steering computer 44 now directs the target beam 16 in a desired direction, here at angle $\theta_T$ by supplying control signals to phase shifters 40a–40n. Hence, the beam 16 is associated with beam port $E_s$. Here, processor 28 provides an output signal at port 30 having the maximum ratio of desired output (at port 30) signal power $P_s$ to the output (at port 30) power interfering signal source of $|I|^2$. Thus, the signals at the outputs of ports $E_s$, $E_{I1}$ are weighted in accordance with:

$$\hat{W}_{opt}=\hat{M}_T^{-1}\,T$$

where:

$$\hat{M}_T=\frac{1}{S}\sum_{s=1}^{S}X_s(X_s^T)^*$$

where:

$$X_s=\begin{bmatrix}E_s\\E_{I1}\end{bmatrix}$$

$$T=\begin{bmatrix}1\\0\end{bmatrix}$$

S=number of time samples
"ˆ" designates estimate

Thus, for one interfering signal source:

$$W_{opt}=\begin{bmatrix}\hat{W}_0\\\hat{W}_1\end{bmatrix}=\frac{1}{|M|}\begin{bmatrix}\widehat{|\overline{E_{I1}}|^2}\\-\widehat{\overline{E_sE_{I1}^*}}\end{bmatrix}$$

where $$\widehat{|\overline{E_{I1}}|^2}=\frac{1}{S}\sum_{s=1}^{S}E_{I1s}\cdot E_{I1s}^*;\quad \widehat{\overline{E_SE_{I1}^*}}=\frac{1}{S}\sum_{s=1}^{S}E_{Ss}E_{I1s}^*$$

$E_{I1s}$=sth time sample of $E_{I1}$; $E_{Ss}$=sth time sample of $E_S$; and $|M|$ is the determinate of M.

Hence, here the signals produced at the desired signal port $E_s$ are multiplied by $\hat{W}_0$ (to form $E_s\cdot\hat{W}_0$) and the signals produced at the interfering signal port $E_{I1}$ are weighted by $\hat{W}_1$ (to form $E_{I1}\cdot\hat{W}_1$). The resulting weighted signals: $E_s\cdot W_o$, and, $E_{I1}\cdot\hat{W}_1$ are summed (added) together to form the signal E at port 30;

$$E=E_{I1}\cdot\hat{W}_1+E_s\cdot\hat{W}_0$$

$$=E_{I1}\left[\frac{\widehat{\overline{E_sE_{I1}^*}}}{|\hat{M}|}\right]+E_s\left[\frac{\widehat{\overline{|E_{I1}|^2}}}{|\hat{M}|}\right]$$

$$\approx-\frac{E_s|E_{I1}|^2}{|M|}+\frac{E_s|E_{I1}|^2}{|M|}\approx 0$$

Thus, the interfering signal is cancelled in the processor 28.

Figure 5:
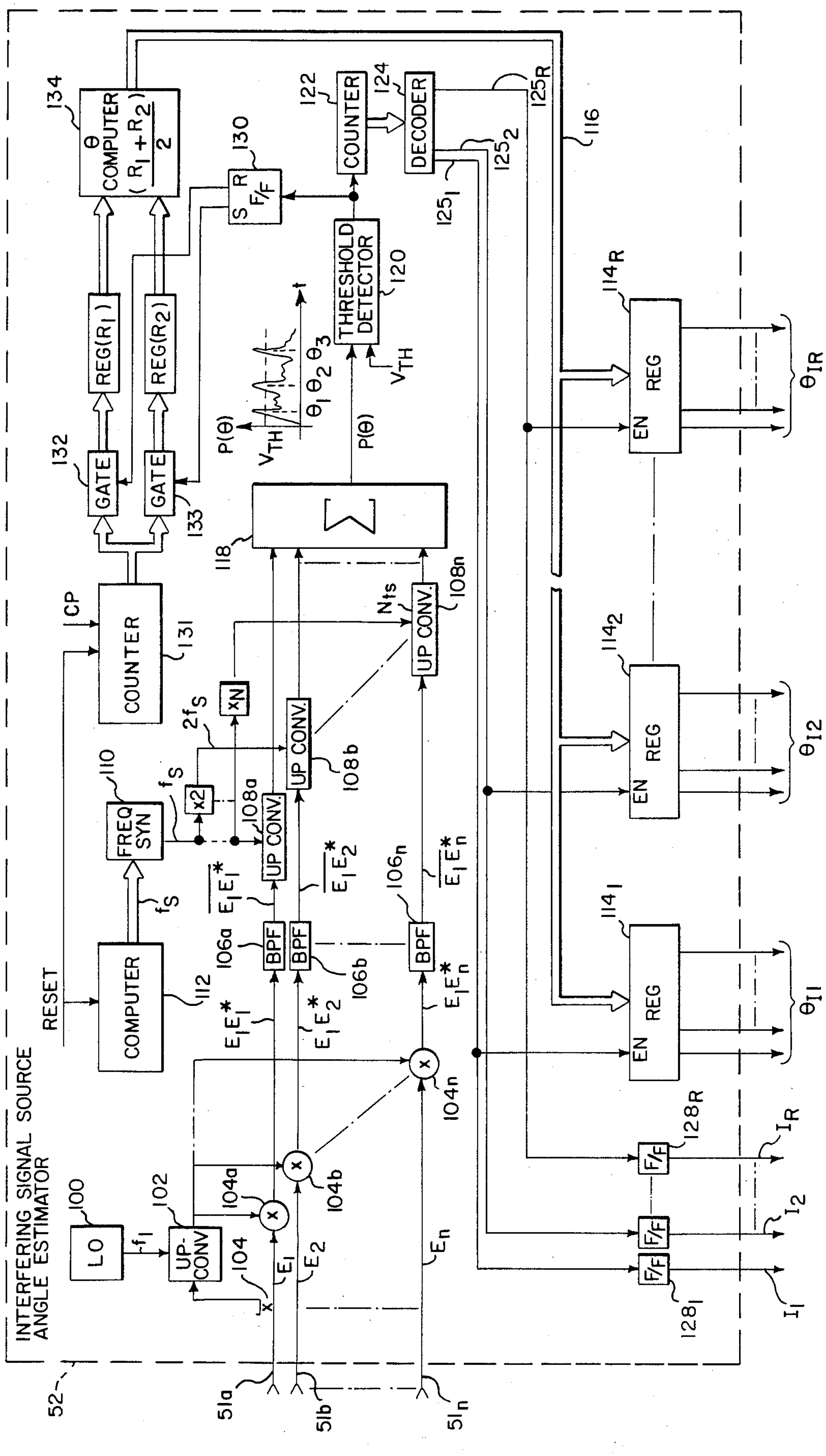
FIG. 5 is a block diagram of an interfering signal source angle estimator used in the system of FIG. 1.

Referring now to FIG. 5, interfering signal source angle estimator 52 is shown in detail. As noted above, here estimator 52 uses DFT technique to provide an indication of the number of interfering signal sources R and the angles of such R sources $\theta_{I1}$–$\theta_{IR}$ to the processor 28. Thus, here the signals are fed to estimator 52 via lines 51a–51n. The signals $E_1$–$E_n$, respectively, are up-converted in frequency from a frequency, $f_o$, to a frequency $f_o+f_1$, where $f_1$ is the frequency of a local oscillator 100. This up-conversion is here performed by passing a portion of the signal $E_1$ on line 51a to a conventional up-converter 102 via directional coupler 104. Also fed to the up-converter 102 is the local oscillator signal. The resulting signal is thus at a frequency $(f_o+f_1)$ and such resulting signal is fed to a plurality of mixers 104a–104n. Also fed to mixers 104a–104n are the signals $E_1$ to $E_n$, respectively, as shown. The resulting signals are thus $E_1E_1^*$ to $E_1E_n^*$, respectively, and such signals are fed through band pass filters 106a to 106n, respectively, as shown. The band pass filters 106a–106n each have a center frequency at $f_1$ and each have a bandwidth $(1/S)B_s$ where S is the number of samples to be taken and $B_s$ is the bandwidth of a received radar pulse. The effect of the band pass filters 106a–106n is to average the signals $\overline{E_1E_1^*}$ to $\overline{E_1E_n^*}$ fed into them to to produce output signals $\overline{E_1E_1^*}$ to $\overline{E_1E_n^*}$, respectively. The output signals $E_1E_I^*$ to $E_1E_n^*$ are fed to upconverters 108a–108n, respectively, as shown. Also fed to up-converters 108a–108n are signals having frequencies $f_s$ to $Nf_s$, respectively. A signal having the frequency $f_s$ is produced by a frequency synthesizer 110. The signals having the frequencies $2f_s$ to $Nf_s$ are produced by passing a portion of the signal produced by frequency synthesizer 110 through frequency multiples x2, . . . xN, respectively. Frequency synthesizer 110 is controlled by a computer 112. Here computer 112 commands the frequency synthesizer to produce a signal having the frequency $f_s$ such that $\theta(t)$ linear sweeps from $-\theta_{max}=-\pi/2$ to $+\theta_{max}=+\pi/2$ where $$\theta(t) = \sin^{-1}\frac{[\lambda f_s t]}{d},$$

when t goes from $-d/(\lambda f_s)$ to $+d/(\lambda f_s)$. The signals produced by up-converters 108a–108n are fed to a summing network 118; the output of which is thus the signal $P(\theta)$ given in Equations (5) and/or (7) above. Thus, as computer 112 commands frequency synthesizer 110 to sweep, sinusoidally, at frequency $f_s$, an output signal $P(\theta)$ is produced, as a function of time, as shown. The signal $P(\theta)$ is fed to a threshold detector 120 along with a suitable threshold voltage, $V_{TH}$. When $P(\theta)$ exceeds threshold $V_{TH}$, indicating the presence of a strong interfering signal, a flip/flop 130 is placed in a "set" condition to enable the count of a counter 131 to pass through gate 132 to a first register $R_1$ and when $P(\theta)$ returns below $V_{TH}$, flip/flop 130 is reset to enable the count of counter 131 to pass through gate 133 to register $R_2$. The counter 131 is fed with clock pulses (CP) at a very high rate, here greater than $Nf_s$ and such counter 131 is reset by the same signal resetting computer 112 (i.e. at the end of the linear sweep from $-\theta_{max}$ to $+\theta_{max}$). The outputs of registers $R_1$, $R_2$ are fed to computer 134 which thus determines the average angle $\theta$ where $P(\theta)$ peaked; that is $R_1$ stores data representative of the angle where $P(\theta)$ starts (i.e., "rises") to peak and $R_2$ stores data representative of the angle where $P(\theta)$ ends ("falls") with the result that $(R_1+R_2)/2$ is the approximate $\theta$ at which $P(\theta)$ peaks. The output of computer 134 is fed to a plurality of registers 114a–114R via bus 116. As illustrated in FIG. 5, there are three interfering signal sources at angles $\theta_1$, $\theta_2$, $\theta_3$. These three pulses were produced when $f_s$ was: $2\pi(d/\lambda)\sin\theta_1$; $2\pi(d/\lambda)\sin\theta_2$; and $2\pi+d/\lambda)\sin\theta_3$, respectively. Each produced pulse is counted by counter 122. The contents stored in counter 122 are fed to a decoder 124. Decoder 124 produces an enable signal on one of its R output lines $125_1$–$125_R$ in response to the data stored in counter 122. Output lines $125_1$–$125_R$ are fed to enable terminals (EN) of registers $114_1$–$114_R$, respectively, as shown. Further, the output lines $125_1$–$125_R$ are fed to flip/flops $128_1$–$128_R$, respectively. Thus, in the example, when a pulse in $P(\theta)$ was produced at a time when $2\pi f_s t$ was $2\pi(d/\lambda)\sin\theta_1$, the digital word representative of $\theta_1$ on bus 116 is stored in the register $114_1$ in response to an enable signal produced on line $125_1$ and flip/flop $128_1$ is placed in a "set" condition. Likewise, in response to pulses $P(\theta_2)$, $P(\theta_3)$ at times when $2\pi f_s t$ was $2\pi(d/\lambda)\sin\theta_2$, $2\pi(d/\lambda)\sin\theta_3$, digital words became stored in registers $114_2$, $114_3$ in response to enable signals produced by decoder 124 on lines $125_2$, $125_3$ and flip/flops $128_2$, $128_3$ become "set", respectively. Thus, at the end of the sweep in $\theta$ (or $2\pi f_s t$), the ones of the number of "set" flip/flops $128_1$–$128_R$ indicates the number of interfering signals and the registers $114_1$–$114_R$ store the angles $\theta_{I1}$–$\theta_{IR}$ of the interfering signals.

The data $\theta_{I1}$–$\theta_{IR}$ stored in registers $114_1$–$114_R$ are fed to the R phase shifter sets $58_1$–$58_R$ (FIG. 1), respectively, to produce a directed beam at each one of the detected interfering signal sources. The status of flip/flops $128_1$–$128_R$ is fed to processor 28 via lines $I_1$–$I_R$, respectively. Thus, here, where a flip/flop is placed in a set state, the line $I_1$–$I_R$ coupled to the output thereof is "high". Thus, for example, if interfering signal sources are detected at angles $\theta_1$ and $\theta_2$, lines $I_1$ and $I_2$ are "high".

Figure 6:
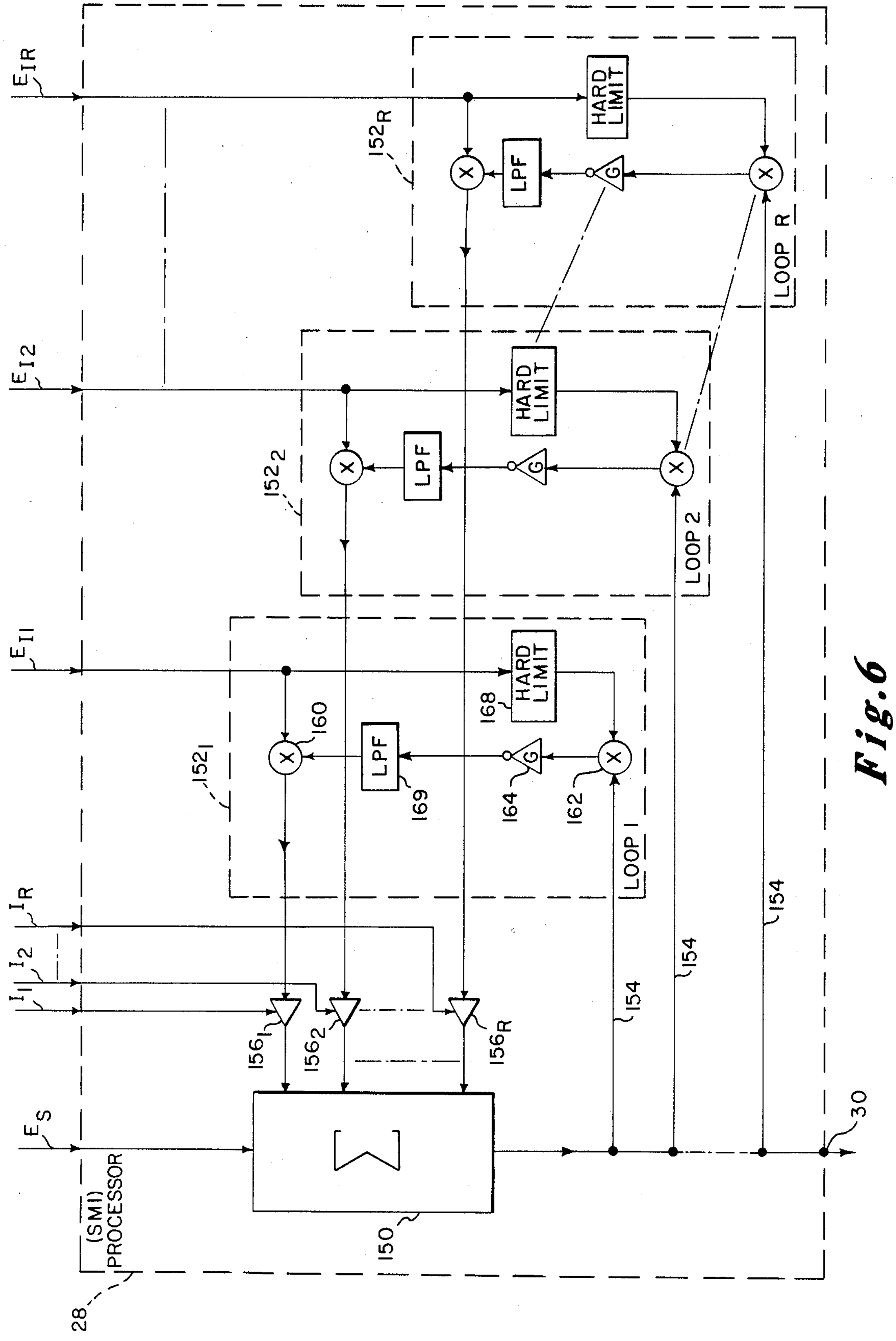
FIG. 6 is a block diagram of a processor used in the system of FIG. 1.

Processor 28 is shown in detail in FIG. 6. It is first noted that processor 28 is fed from: the desired signal port $E_s$; and the interfering signal ports $E_{I1}$–$E_{IR}$ of the beam forming network 12 (FIG. 1); and lines $I_1$–$I_R$ from the interfering signal source angle estimator 52 (FIGS. 1 and 5). Here processor 28 uses the Applebaum feedback adaptive control loop technique described in connection with FIG. 6-1 of the Applebaum article described above but with the hard-limiter modification described in connection with FIG. 14 of the article by Gabriel referred to above. It is noted that here the processing is performed on one plus the number of detected interfering signal sources. Thus, processor 28 includes a summing network 150 coupled to the desired signal port $E_s$ and to those of the interfering signal ports $E_{I1}$–$E_{IR}$ which are associated with detected interfering signal sources. More particularly, the processor 28 includes R, hard-limiter type adaptive control loops $152_1$–$152_R$, each of the type described in connection with FIG. 16 in the Gabriel article. Each of the control loops is coupled to the output of the summing network 150 via line 154 while control loops $152_1$–$152_R$ are also coupled to interfering signal ports $E_{I1}$–$E_{IR}$, respectively, as shown. The outputs of the control loops $152_1$–$152_R$ are fed to gated amplifiers $156_1$–$156_R$, respectively, as shown. Gating signals are fed to gated amplifiers $156_1$–$156_R$ from the flip/flops $128_1$–$128_R$ (FIG. 5) of interfering signal source angle estimator 52 via output lines $I_1$–$I_R$, respectively, as shown. Only high signals on an output line $I_1$–$I_R$ enable the signals fed to the amplifiers $156_1$–$156_R$, respectively to pass therethrough, otherwise, the output of the amplifiers $156_1$–$156_R$ is grounded. Thus, the outputs of only those control loops tracking a detected interfering signal source are fed to the summing network 150. Therefore, if there is only one detected interfering signal source, only output line $I_1$ is "high" and only the output of loop $152_1$ is fed to summing network 150 (along with the signal at desired signal port $E_s$). Thus, each one of the control loops $152_1$–$152_R$ is identical in construction and, as shown for loop $152_1$, such loop $152_1$ includes a quadrature phase detector 160 coupled to a quadrature modulator 162 through quadrature channels, such channels having an amplifier 164 of gain G and low-pass filter 169. A hard-limiter 168 is coupled between the corresponding one of the interfering signal source ports $E_{I1}$ and the quadrature phase detector 162. Quadrature phase detector 162 is coupled to line 154 and mixer 160 is coupled between port $E_{I1}$ and amplifier $156_1$. As discussed by Appelbaum in the article referred to above, when the loop gain is high enough, the output at port 30 may be represented as:

$$E=[E_s, E_{I1}, E_{I2}, \ldots, E_{IR}]\hat{W}_{opt}$$

having the maximum ratio of the desired signal power $P_s$ to the power of the interfering signal sources.

Figure 7:
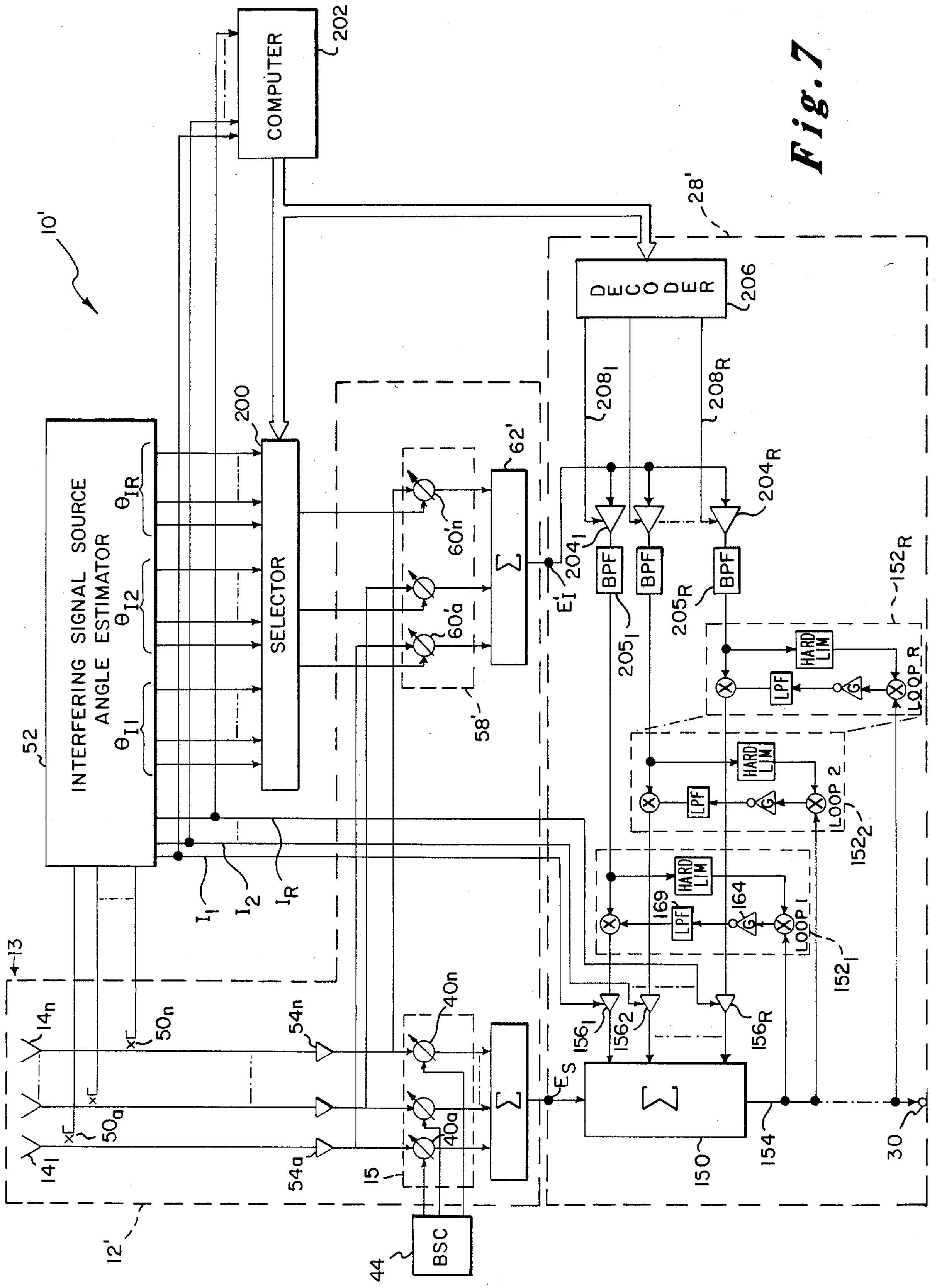
FIG. 7 is a block diagram of an antenna system using a beam forming network according to a first alternative embodiment of the invention.

Referring now to FIG. 7, an alternative radio frequency antenna system 10' is shown similar to system 10 described in connection with FIG. 1; here, however, instead of having R sets of phase shifters, i.e., sets $58_1$–$58_R$, one for each interfering signal source, as in system 10 (FIG. 1); here, there is only one set of phase shifters 58' with such single set 58' being used on a time-sharing basis among the interfering signal sources. Thus, the beam forming network 12' again includes N antenna elements 14a–14n in a linear array across aperture 13, the output being coupled via couplers 50a–50n to both: an interfering signal source angle estimator 52; and through amplifiers 54a–54n to a set 15 of phase shifters 40a–40n controlled by beam steering computer 44 to produce at port $E_s$ a beam pointing at the desired target as described in connection with FIG. 1. The outputs of amplifier 54a–54n are fed (via a 2:1 power divider not shown) to the single set 58' of interfering signal source beam phase shifters 60a'–60n'. The outputs of the phase shifters 60a'–60n' are fed to a single interfering signal source port $E_I'$ via summing network 62'. Interfering signal source angle estimator 52 is here that shown in FIG. 5 and produces on lines $I_1$–$I_R$ signals representative of the number of interfering signal sources detected and angles $\theta_{I1}$–$\theta_{IR}$ of such detected signal sources as described above in connection with FIG. 5. Here, however, the digital words stored in registers 114$_1$–114$_R$ (FIG. 5) are fed to a selector 200. The selector 200 is controlled by a computer 202. Computer 202 is fed with the signals on output lines $I_1$–$I_R$ to provide such computer 202 with an indication of the number of detected interfering signal sources. (It is noted that such count information could be obtained from counter 122 (FIG. 5)). Computer 202 addresses selector 200 so that the data in registers 114$_1$–114$_R$ (i.e., the data $\theta_{I1}$–$\theta_{IR}$) becomes sequentially coupled to the output of the selector 200 and hence to the phase shifters 60a'–60n'. Thus, if four interfering signals are detected, registers 114$_1$–114$_4$ are sequentially coupled to the output of selector 200. The rate of switching between registers is here $J_B$ where $J_B = RB_s$ where R is the maximum number of interferring signal sources expected and $B_s$ is the signal bandwidth (radar pulse width). Thus, at the end of the coupling sequence, it is noted that interfering signal beam at port $E_I'$ has switched from interfering signal source $I_1$, then to source $I_2$, then to source $I_3$, and finally to source $I_4$. The process then repeats again and again. Port $E_I'$ is coupled to R gating amplifiers 204$_1$–204$_R$, as shown, of processor 28'. The command signal fed to selector 200 is also fed to a decoder 206 of processor 28'. In response to each command produced by computer 202, a corresponding one of R enable lines 208$_1$–208$_R$ is enabled thus enabling the one of the gating amplifiers 204$_1$–204$_R$ coupled to such one of the lines 208$_1$–208$_R$, respectively, to pass the signal at port $E_I'$ to the output of such enabled one of the amplifiers 204$_1$–204$_R$. Thus, it follows that as the beam at port $E_I'$ switches sequentially from interfering source $I_1$ to interfering source $I_2$, for example, as when there are two detected interfering signal sources the amplifiers 204$_1$, 204$_2$ are correspondingly sequentially enabled. The outputs of amplifiers 204$_1$–204$_R$ are fed to control loops 152$_1$–152$_R$, respectively, via band pass filters 205$_1$–205$_R$, respectively, as shown. The output of the control loops 152$_1$–152$_R$ are fed to the inputs of gated amplifiers 156$_1$–156$_R$. The gated amplifiers 156$_1$–156$_R$ are enabled in accordance with control signals on lines $I_1$–$I_R$ as described in connection with FIG. 6. Thus, if there are only two detected interfering signal sources, only amplifiers 156$_1$ and 156$_2$ are enabled. The outputs of gated amplifiers 156$_1$–156$_R$, together with desired signal port $E_s$, are fed to summer 150, as shown. The output of summer 150 is coupled to port 30 and to the control loops 152$_1$–152$_R$ via line 154$_1$, as shown. The band pass filters 205$_1$–205$_R$ are smoothing filters to provide a continuous signal to the control loops 152$_1$–152$_R$. The band pass of the band pass filter is equal to $B_s$ where $B_s$ is signal bandwidth (i.e., $1/B_s$ is the radar pulse width).

Figure 8:
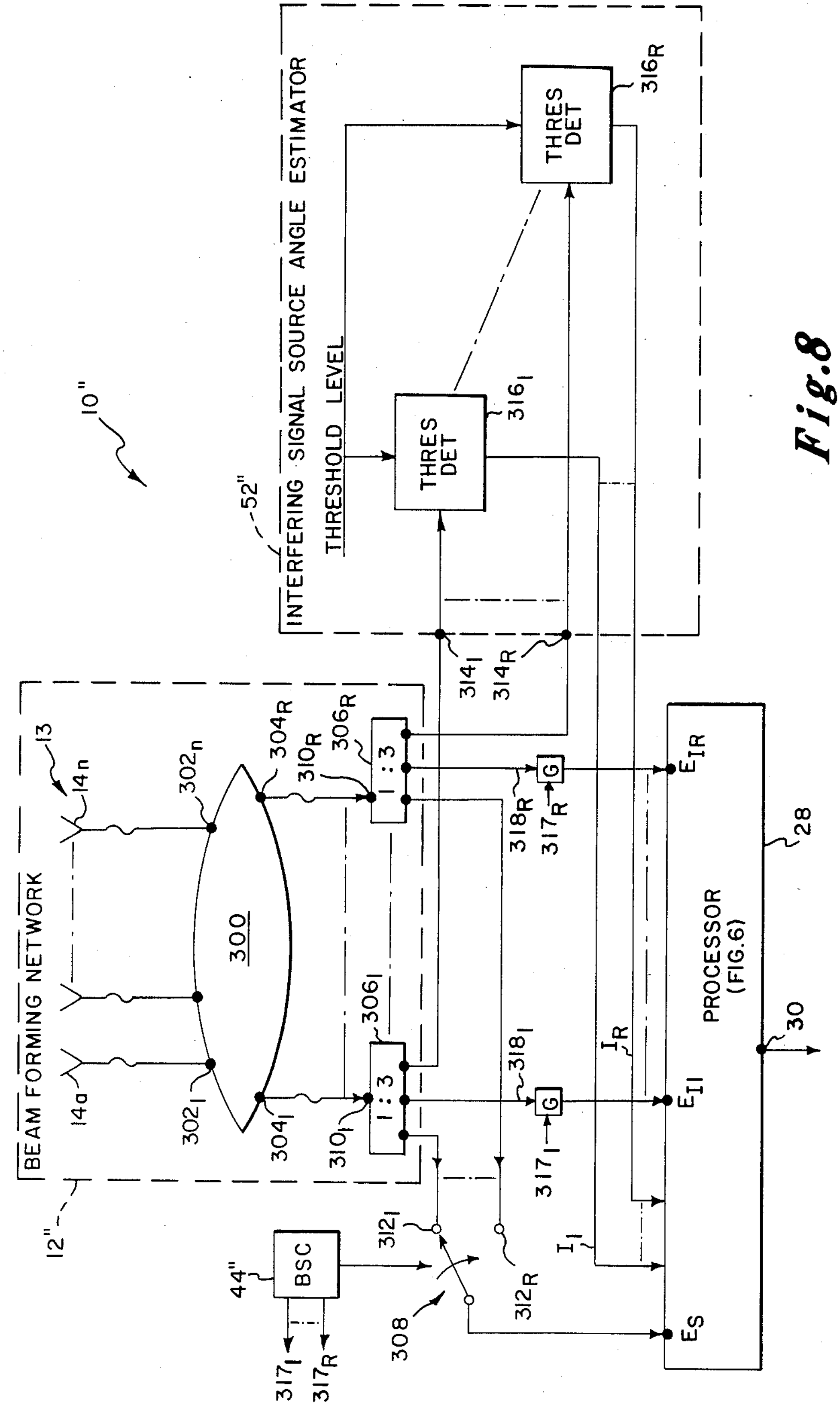
FIG. 8 is block diagram of an antenna system using a beam forming network according to a second alternative embodiment of the invention.

Referring now to FIG. 8, another alternative radio frequency system 10" is shown. Here, however, instead of using phased array techniques, the beam forming network 12" includes a radio frequency lens 300 of the type described in "Wide-Angle Microwave Lens for Line Source Applications" by W. Rotman and R. G. Turner. Other beam forming networks, such as a so-called Butler feed, as described in "Radar Handbook" Merrill I. Skolnik, Editor-in-Chief, McGraw Hill Book Company (1970) may also be used. In any event, an array 13 of N antenna elements 14a–14n is coupled to the N array ports 302$_1$–302$_n$ of the lens 300. The R array ports 304$_1$–304$_R$ are coupled, via 1:3 power dividers 306$_1$–306$_R$, to: (a) desired signal port $E_s$ of processor 28 via switch 308; (b) the interfering signal ports $E_{I1}$–$E_{IR}$ of processor 28 via gated amplifiers 318$_1$–318$_R$, respectively; and (c) interfering signal source angle estimator 52". As is described in the above mentioned article and in U.S. Pat. No. 3,761,936 "Multi-Beam Array Antenna" issued Sept. 25, 1973, inventor Donald H. Archer, Robert J. Prickett, and Curtis P. Hartwig, assigned to the same assignee as the present invention, the beam forming network 12" produces R differently detected, collimated beams of radio frequency energy from a common array aperture 13, each one of the beams being associated with a corresponding one of the beam ports of the beam forming network 12". Thus, here three sets of R beam ports are produced at the outputs of the 1:3 power dividers 306$_1$–306$_R$. For example, beams at angle $\theta_1$ to $\theta_R$ are associated with the input ports 310$_1$ to 310$_R$ of power dividers 306$_1$–306$_R$, respectively. Thus, the input ports 312$_1$–312$_R$ of switch 308 are associated with beams pointed at angles $\theta_1$–$\theta_R$, respectively. The interfering signal ports $E_{I1}$–$E_{IR}$ are associated with beams at angles $\theta_1$–$\theta_R$, respectively. Likewise, the input ports 314$_1$–314$_R$ of interfering signal source angle estimator 52" are associated with beams pointed at angles $\theta_1$–$\theta_R$, respectively.

Beam steering computer 44" actuates switch 308 to selectively couple one of the input ports 312$_1$–312$_R$ to processor 28 and hence is equivalent to beam steering computer 44 (FIG. 1) in pointing a beam at a target at a selected angle $\theta_T$. Further, the beam steering computer 44" disables (grounds the output via signals on lines 317$_1$–317$_R$) the one of the gated amplifiers 318$_1$–318$_R$ which is associated with the one of the input ports 312$_1$–312$_R$ selected as the desired signal port $E_s$. Thus, for example, if port 312$_1$ is selected, amplifier 317$_1$ is disabled. The signals at input ports 314$_1$–314$_R$ are fed to threshold detectors 316$_1$–316$_R$, respectively, as shown. Also fed to the threshold detectors 316$_1$–316$_R$ is a threshold voltage signal. The outputs of the threshold detectors thus detect the presence of interfering signal sources; threshold detectors 316$_1$–316$_R$ detecting interfering signals at angles $\theta_1$–$\theta_R$, respectively. The output of each of the threshold detectors goes "high" in response to detection of interfering signal sources at angles $\theta_1$–$\theta_R$, respectively, and hence are equivalent to flip/flops 128$_1$–128$_R$. The outputs of the threshold detectors are fed to processor 28 via lines $I_1$–$I_R$. Hence, the signals now fed to processor 28 are equivalent to those described in connection with FIG. 6 and processor 28 produces an output signal at port 30 as described above.

Figure 9:
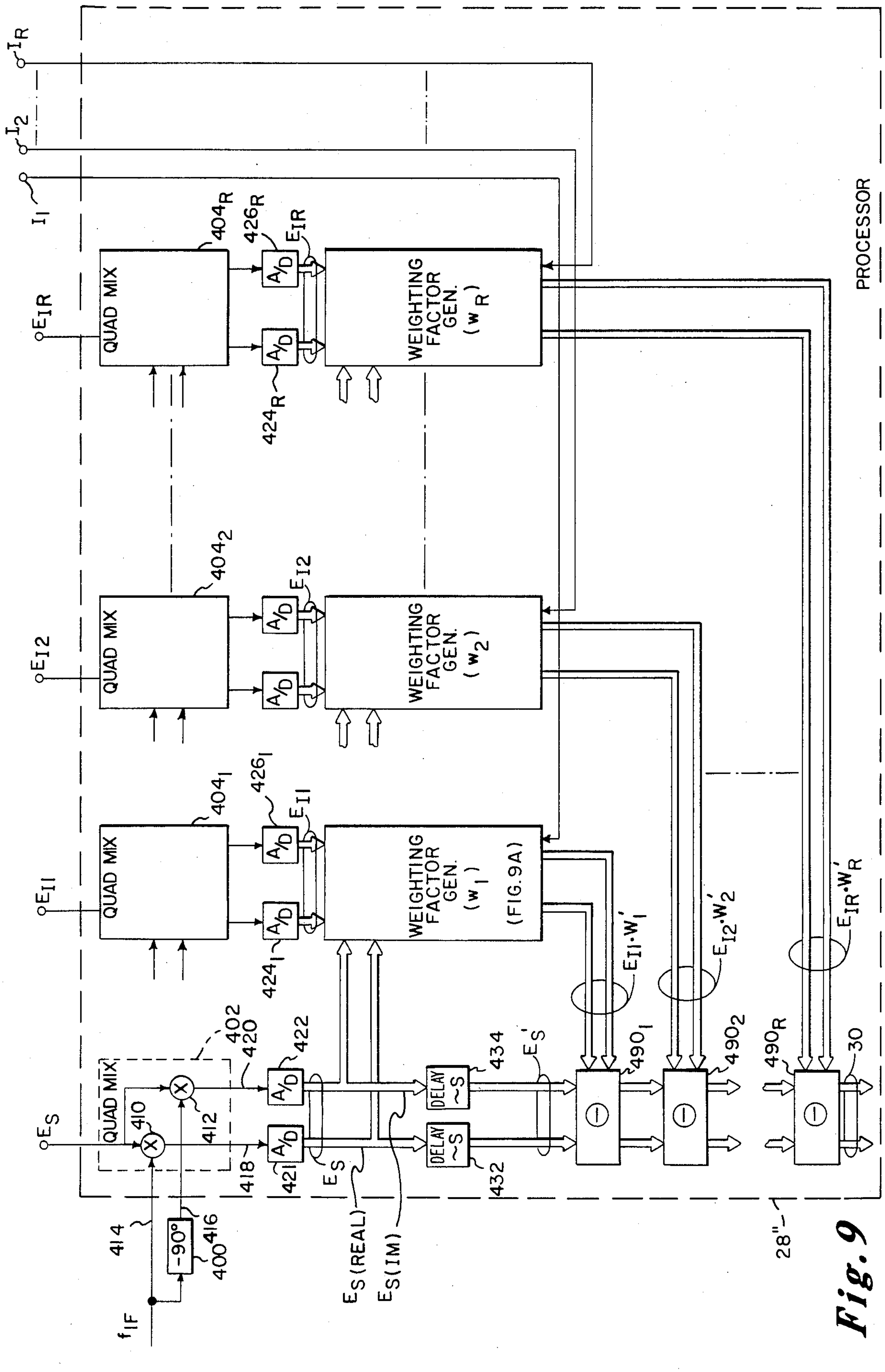
FIG. 9 is an alternative processor for use in the antenna systems of FIGS. 1, 7 and 8.
Figure 9A:
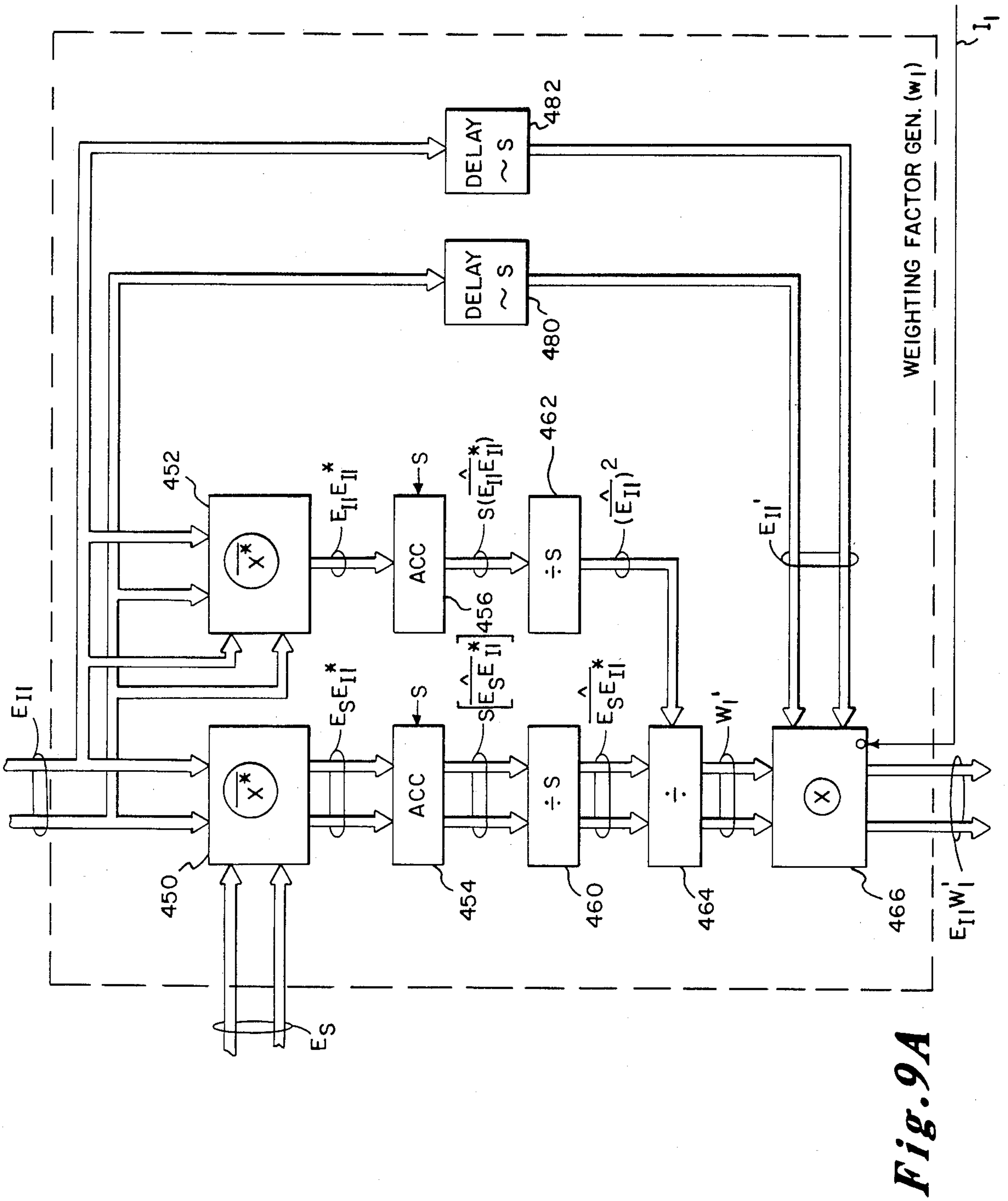
FIG. 9A is a block diagram of an exemplary one of the weighting factor generators used in the processor of FIG. 9.

Referring now to FIG. 9, a digital implementation of a processor adapted to provide SMI processing is shown, such processor being designated 28" and being adapted for substitution with the processor 28 used in system 10 described above in connection with FIG. 1. Thus, here again, processor 28" is coupled to: desired signal port $E_S$; interfering signal ports $E_{I1}$ to $E_{IR}$; and, lines $I_1$ to $I_R$. Here an intermediate frequency signal, coherent with the clocking signal used in the generation of the transmitted radar pulse; is fed in quadrature, via 90 degree phase shifter 400, to (R+1) conventional quadrature mixers 402, 404$_1$–404$_R$, as shown. Each one of the quadrature mixers 402, 404$_1$–404$_R$ is identical in construction and includes, as shown for quadrature mixer 402, a pair of mixers 410, 412, fed by the ports $E_S$, $E_{I1}$–$E_{IR}$ coupled thereto and to the pair of quadrature signals of the intermediate frequency fed thereto via lines 414, 416, as shown, to produce a pair of quadrature baseband signals on lines 418, 420, as shown for exemplary mixer 402. The pair of quadrature baseband signals is fed to a pair of analog-to-digital (A/D) converters 421, 422, respectively, as shown, to produce digital words representative of the "real" and "imaginary" portions of the signal fed to the quadrature mixer. Thus, the digital word produced at the output of A/D converter 421 represents the "real" portion of the signal at the desired signal port $E_S$ (i.e., $E_{S(REAL)}$ and the digital word produced at the output of A/D converter 422 represents the "imaginary" portion of the signal at the desired signal port $E_S$ (i.e., $E_{S(IM)}$). The total output of the A/D converters 421, 422 thus being the complex number $E_S$, as indicated. Likewise, the digital words produced by A/D converters 424$_1$, 426$_1$ to 424$_R$, 426$_R$, may be represented as complex numbers $E_{I1}$ to $E_{IR}$, respectively, as indicated, each having a "real" portion and an "imaginary" portion. The complex number $E_S$ is fed to a subtractor 490 via delay networks 432, 434, as shown. The vectors $E_{I1}$ to $E_{IR}$ are fed to weighting factor generators $W_1$ to $W_R$, respectively, as shown. Each one of the weighting factor generators $W_1$ to $W_R$ is identical in construction, an exemplary one thereof, here weighting factor generator $W_1$ is shown in detail in FIG. 9A to include a pair of complex multipliers 450, 452; complex conjugate multiplier 450 being fed by complex numbers $E_S$ and $E_{I1}$ to form the product $E_SE^*_{I1}$ and, complex conjugate multiplier 452 being fed by the vector $E_{I1}$ to form $E_{I1}E^*_{I1}$. The products produced by complex conjugate multipliers 450, 452 are fed to accumulators 454, 456, respectively, as shown. Accumulators 454, 456 here accumulate a predetermined number, here S, of the products produced by complex conjugate multipliers 450, 452 to form:

$$\sum_0^S [E_sE_I^*] \text{ and } \sum_0^S [E_{Il}E_{Il}^*], \text{ respectively.}$$

The outputs of accumulators 454, 456 are thus $S[\overline{\hat{E_sE_{I1}}}]$ and $S[\overline{E_{I1}E_{I1}^*}]$, respectively, and are fed to dividers 460, 462, respectively, to divide by S and thus form $\overline{E_sE_{I1}^*}$ and $|\overline{E_{I1}}|^2$, respectively. The outputs of dividers 460, 462 are are fed to a divider 464 to form the weight factors $W_1'$ where:

$$W_1' = -W_1/W_O = [\overline{E_sE_{I1}^*}/\overline{|E_{I1}|^2}]$$

The weighting factor $W_1'$ is a complex number, and is fed to complex multiplier 466. Also fed to multiplier 466 is: line $I_1$ (from flip/flop 128$_1$ of FIG. 5 of interfering source angle estimator 52); and, the complex number $E_{I1}'$, where the complex number $E_{I1}'$ is the complex number $E_{I1}$ produced by A/D converters 424$_1$, 426$_1$, coupled to the output of quadrature mixers 404$_1$ but delayed in time by delay networks 480, 482 so that the delayed complex number $E_{I1}'$ is processed concurrently with the weighting factor $W_1'$ in multiplier 466 with the result that if line $I_1$ is "high", the output of multiplier 466 is $E_{I1}W_1'$, whereas if line $I_1$ is not "high", the output of multiplier 466 is zero. The output of multiplier 466 is subtracted from the complex number $E_S'$ produced at the output of delay networks 432, 434 (to produce approximately the same delay as delay networks 480, 482) in subtractor 490$_1$. The difference, that is, the output of subtractor 490$_1$ is fed to subtractor 490$_2$ along with $E_{I2}W_2'$ produced by weighting factor generator $W_2'$. The process continues for weighting factor generators coupled to all the interfering signals source ports with the final weighting factor $W_R'$ (assuming R interfering signal sources) used to form $E_{IR}W_R'$ for multiplier 490$_R$, the output of such subtractor 490$_R$ being, in effect, the outputport 30 shown in system 10 of FIG. 1.

Figure 10:
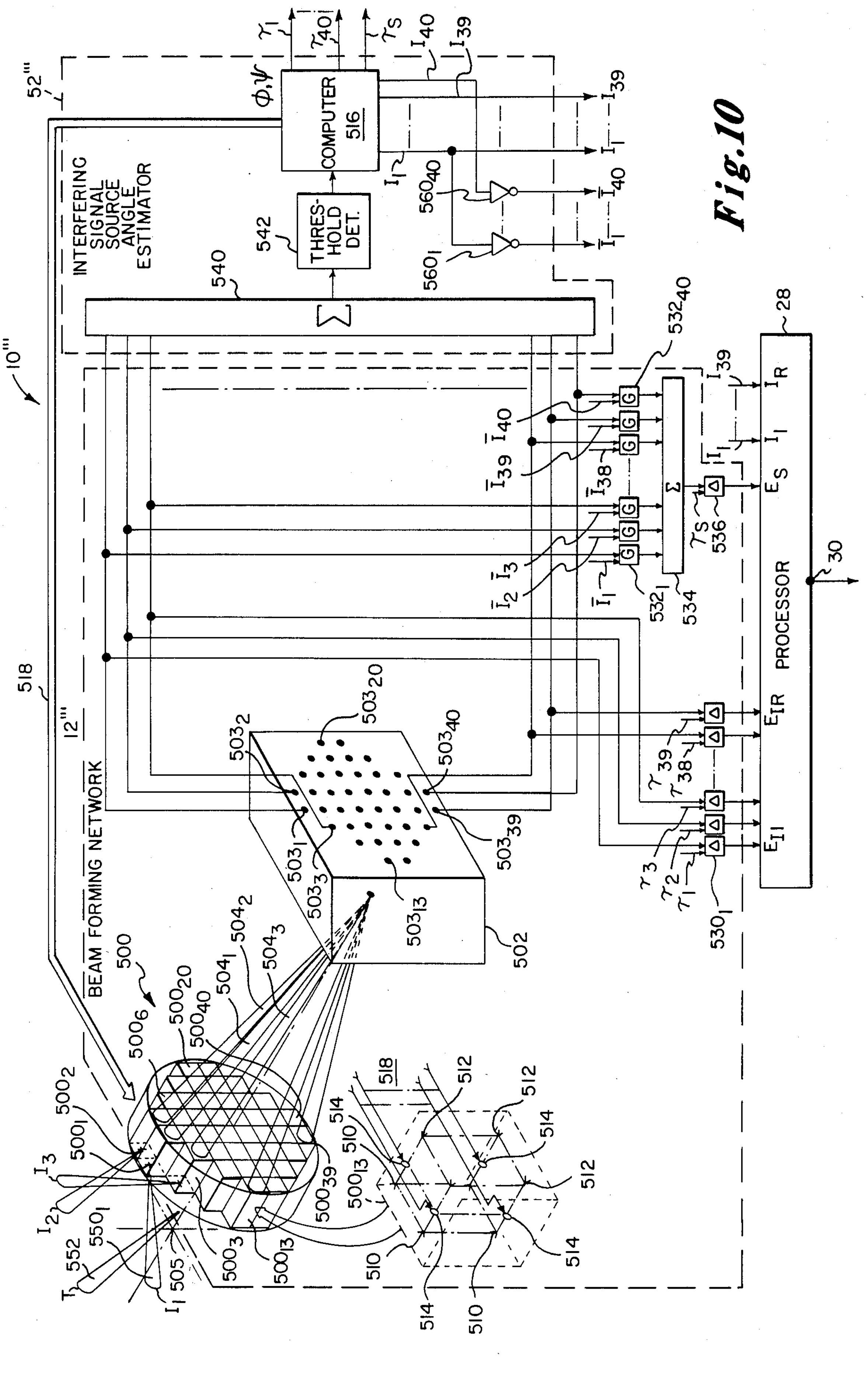
FIG. 10 is a block diagram of an alternative embodiment of an antenna system according to the invention.

Referring now to FIG. 10, an alternative radio frequency antenna system 10''' is shown similar to systems 10, 10' described above in connection with FIGS. 1 and 7, respectively; here, however, beam forming network 12''' includes: a two-dimensional, space fed, phased array antenna section 500 made up of a plurality of, here 40, phased array sub-sections 500$_1$–500$_{40}$, an exemplary one thereof, here array sub-section 500$_{13}$, being shown in detail; and, a two-dimensional beam forming network assembly 502, here made up of a plurality of radio frequency lenses (not shown) arranged as beam forming network 22 described in U.S. Pat. No. 3,979,754, entitled "Radio Frequency Array Antenna Employing Stacked Parallel Plate Lenses", inventor Donald H. Archer, issued Sept. 7, 1976 and assigned to the same assignee as the present invention. Thus, assembly 502 has a plurality of, here 40, beam ports 503$_1$–503$_{40}$ arranged as shown in an array of rows and columns, as shown. Each one of such beam ports 503$_1$–503$_{40}$ is associated with a differently directed collimated beam of radio frequency energy. More particularly, the beams associated with beam ports 503$_1$–503$_{40}$ are directed to phased array sub-sections 500$_1$–500$_{40}$, respectively. Thus, beam 504$_1$ is directed to array sub-section 500$_1$ and such beam 504$_1$ is associated with beam port 503$_1$; beam 504$_2$ is directed to array sub-section 500$_2$ and such beam is associated with beam port 503$_2$; etc.

Referring in more detail to the exemplary one of the sub-phased array sections 500$_1$–500$_{40}$, here section 500$_{13}$, such section 500$_{13}$ is shown to include an array of receiving antenna elements 510 coupled to an array of transmitting antenna elements 512 through corresponding phase shifters 514, as shown. (It is noted that the antenna could be used in the transient mode in which case the receiving element 510 becomes transmitting element and transmitting element 512 becomes receiving element). The phase shifters are controlled by control signals fed thereto by computer 516 via bus 518. Thus, each one of the array sub-sections 500$_1$–500$_{40}$ is adapted to form a collimated and directed beam of radio frequency energy; the direction of such collimated beam can be independent of the direction of the collimated beam produced by another one of the array subsections. The phase center of each such beam would be the center of the sub-array section producing such beam. Alternatively, a cluster of adjacent sub-array sections may be controlled to produce a single collimated beam having a direction independent of the direction of collimated beams produced by array sub-sections not a part of the cluster. In this regard, it is noted that as the number of sub-array sections being used to form the composite beam increases, the beam width of such composite beam narrows correspondingly. Further, the phase center of the composite beam would be the center at the centroid of the cluster of the array sections producing the composite beam. Finally, in this regard, the entire array, i.e., all forty sub-array sections may be used to form a single composite, collimated and directed beam of radio frequency, such beam would thus be the narrowest produced beam by the array 500 and such beam would have a phase center at the center of the array 500. In any event, one system which may be used to control the array, or array sub-sections, is described in U.S. Pat. No. 4,445,119, "Distributed Beam Steering Computer", inventor George A. Works, issued Apr. 24, 1984 and assigned to the same assignee as the present invention.

The beam ports $503_1$–$503_{40}$ are fed to: (1) interfering signal source angle estimator 52'''; (2) to interfering signal ports $E_{I1}$–$E_{IR}$ (where here R is here 40) of processor 28 (which alternatively may be either processor 28' or processor 28'') after passing through time delay networks $530_1$–$530_{39}$, respectively, as shown; and, (3) desired signal port $E_s$ of such processor 28 after passing through gates $532_1$–$532_{40}$, respectively, as shown, summing network 534 and time delay network 536, as shown. Interfering signal source angle estimator 52''' includes a summing network 540 having inputs coupled to beam ports $503_1$–$503_{40}$ and an output coupled to a threshold detector 542. The output of the threshold detector is fed to computer 516. During the initial phase of operation, the computer 516 uses the entire array 500 and sends commands via bus 518 to produce a single component beam whose phase center is at the center of the antenna 505 and scans such beam in raster-fashion in both azimuth and elevation. During the raster-scan search mode, any time energy is received above a predetermined threshold (thereby indicating the presence of an interfering signal source), a signal is fed by threshold detector 542 to the computer 516 and the computer stores the azimuthal and elevation angles $\phi$, $\psi$, of such detected interfering signal source. After completing the entire scan in azimuth and elevation, the computer 516 has stored in it information on the number of interfering signal sources and the azimuthal and elevation angles of one of such interfering signal sources. The computer 516 uses this information to assign the same number of array sub-sections the task of producing beams at these interfering signal sources and assigns the remaining array sub-sections the task of producing a composite beam at the desired target. The array sub-sections are assigned to detect interfering signal sources in ascending order, i.e., from array sub-sections $500_1$–$500_{39}$. It is noted that at least one array sub-section must be used for the desired target and here array sub-section $500_{39}$ is reserved for such purpose. Thus, as illustrated in FIG. 10, three interfering signal sources $I_1$, $I_2$, $I_3$ were detected after completion of the raster scan. The computer 516 then assigns three of the array sub-sections the task of directing three collimated beams at each of these three interfering signal sources $I_1$, $I_2$, $I_3$. Thus, here array sub-sections $500_1$ is assigned the task of producing a collimated beam $550_1$ directed at source $I_1$; such array sub-section $500_2$ is assigned the task of producing a collimated beam $550_2$ directed at source $I_2$; and sub-array section $500_3$ is assigned the task of producing a collimated beam $550_3$ at source $I_3$. The remaining array sub-sections $500_4$–$500_{40}$ are assigned the task of producing a composite beam 552 at the desired target T, as shown. (It is noted that each of the beams $550_1$, $550_2$, $550_3$ and 552 has a different phase center from which it eminates, as shown.) The computer 516 also produces output signals on lines $I_1$–$I_{39}$. Each one of these lines $I_1$–$I_{39}$ is associated with each one of the interfering signal sources (here it is possible to handle up to thirty-nine interfering signal sources with at least one sub-array being used for the desired signal. Thus, since as illustrated in FIG. 10, three interfering signal sources $I_1$, $I_2$, $I_3$ have been detected, the signals on line $I_1$, $I_2$, $I_3$ are "high" and the signals on lines $I_4$–$I_{40}$ are "low". The signals on lines $I_1$–$I_{40}$ are fed to inverters $560_1$–$560_{40}$, respectively, as shown; thus producing complementary signals on lines $\overline{I_1}$–$\overline{I_{40}}$, respectively. Lines $I_1$–$I_{39}$ are fed to terminals $I_1$–$I_R$ of processor 28, and such signals are used as described in connection with processors 28, 28' and 28'' above. The lines $\overline{I_1}$–$\overline{I_{40}}$ are fed to gates $532_1$–$532_{40}$, respectively, as shown. Thus, here the signals on lines $\overline{I_1}$, $\overline{I_2}$ and $\overline{I_3}$ are "low" while the signals on lines $\overline{I_4}$–$\overline{I_{40}}$ are "high" with the result that the signals at beam ports $503_1$, $503_2$, $503_3$ are inhibited from passing to summer 534 while the signals at beam ports $503_4$–$503_{40}$ are passed to summer 534 where they combine to form the composite beam 552 directed to target T. Thus, here the energy at interfering signal source ports $E_{I1}$, $E_{I2}$, $E_{13}$ of processor 28 are associated with beams $550_1$, $550_2$, $550_3$, respectively, and are directed at interfering signal sources $I_1$, $I_2$, $I_3$, respectively, and the signal at desired signal port $E_S$ is associated with the composite beam 552 which is directed to the desired signal or target T. As described above in connection with processor 28, the signals on lines $I_1$–$I_{40}$ enable the processor 28 to process data at only the desired signal port $E_S$ and the interfering signal ports which are associated with beams directed at interfering signal sources; i.e., here only interfering signal source ports $E_{I1}$, $E_{I2}$, and $E_{I3}$. The delay networks $530_1$–$530_{39}$ are provided to adjust, in time, for the fact that each of the beams $550_1$, $550_2$, $550_3$ and 552 have different phase centers, i.e., eminate from different spatial positions. Thus, computer 516 having determined the information necessary to produce beams $550_1$, $550_2$, $550_3$ and 552 produces appropriate time delays on lines $\tau_1$–$\tau_{39}$ for delay networks $530_1$–$530_{39}$, respectively, so that the signals at the ports $E_{I1}$–$E_{IR}$ and $E_S$ appear to eminate from the common array 500 phase center location. The processor 28 then produces at output port 30, an output having the maximum ratio of desired signal to interfering signals, as described above.

Having described a preferred embodiment of this invention, it is evident that other embodiments incorporating these concepts may be used. It is felt, therefore, that this invention should not be restricted to the disclosed embodiment, but rather should be limited only by the spirit and scope of the appended claims.

What is claimed is:

1. An antenna system, comprising:

(a) an antenna for receiving energy from a desired signal source and a plurality of interfering signal sources, such interfering signal sources being at different angles $\theta_I$;

(b) a desired signal port;

(c) a plurality of interfering signal ports;

(d) means, coupled to the antenna and responsive to the received energy for producing a desired signal at the desired signal port representative of a beam directed at the desired signal source and for producing signals at the plurality of interfering signal ports representative of differently directed beams;

(e) means, coupled to the antenna, for detecting the presence of an interfering signal source, or sources, and wherein the producing means produces signals at the interfering signal port, or ports, representative of a beam, or beams, directed at the detected interfering signal source, or sources;

(f) gating means having: an input coupled to the plurality of interfering signal parts; an output; and, being responsive to the detecting means, for coupling to the output the portion of the interfering signal port, or ports, producing signals from the detected interfering signal source, or sources, and for inhibiting from passing to the output the remaining portion of the intefering signal port, or ports; and, (g) processor means, coupled to the desired signal port and the output of the gating means, for combining the desired signal at the desired signal port with the signal, or signals at the output of the gating means into a composite signal and for weighting the undesired signal, or signals, passing to the output of the gating means by a factor, W, to equalize the product W $G_I(\theta_I)$ and $G_T(\theta_I)$ where $G_T(\theta_I)$ is the gain of the beam directed at the desired signal source at the angle $\theta_I$.

2. The beam forming network recited in claim 1 wherein the beam producing means comprises a plurality of sets of phase shifters, one of such sets being associated with the beam directed at the desired signal source and another one of such sets being associated with the detected interfering signal source.

3. The beam forming network recited in claim 1 wherein the beam producing means comprises a pair of sets of phase shifters, one of such sets being associated with the beam directed at the desired signal source and the other one of such sets being associated with each one of a plurality of interfering signal sources, such second pair of the sets being time-shared among each one of the plurality of interfering signal sources.

4. The beam forming network recited in claim 1 wherein the beam producing means comprises a radio frequency lens.

5. The beam forming network recited in claim 1 wherein the beam producing means comprises a two-dimensional space fed phased array antenna and a two-dimensional beam forming network coupled to the space fed phased array antenna.

* * * * *

UNITED STATES PATENT AND TRADEMARK OFFICE
CERTIFICATE OF CORRECTION

PATENT NO. : 4,720,712

DATED : January 19, 1988

INVENTOR(S) : Eli Brookner and James M. Howell

It is certified that error appears in the above-identified patent and that said Letters Patent is hereby corrected as shown below:

Column 6, line 50, delete "$\theta_r$" and insert --$\theta_I$--; and

Column 18, line 66, delete "$\theta_r$" and insert --$\theta_I$--.

Signed and Sealed this

Twenty-first Day of June, 1988

Attest:

DONALD J. QUIGG

*Attesting Officer*

*Commissioner of Patents and Trademarks*